US008286105B2

(12) United States Patent
Jong et al.

(10) Patent No.: US 8,286,105 B2
(45) Date of Patent: Oct. 9, 2012

(54) MOBILE TERMINAL AND IDLE SCREEN DISPLAY METHOD FOR THE SAME

(75) Inventors: In Won Jong, Seoul (KR); Sung Hwan Baek, Suwon-si (KR); Jin Yong Kim, Suwon-si (KR); Hee Kyung Jeon, Seoul (KR); Nho Kyung Hong, Seoul (KR); Su Jung Youn, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 770 days.

(21) Appl. No.: 11/902,098

(22) Filed: Sep. 19, 2007

(65) Prior Publication Data
US 2008/0092081 A1 Apr. 17, 2008

(30) Foreign Application Priority Data
Oct. 11, 2006 (KR) .................. 10-2006-0099066

(51) Int. Cl.
G06F 3/14 (2006.01)
(52) U.S. Cl. .................... 715/864; 715/853
(58) Field of Classification Search .......... 715/853, 715/864, 815
See application file for complete search history.

(56) References Cited

U.S. PATENT DOCUMENTS

| 5,912,668 | A   | * | 6/1999  | Sciammarella et al. | ...... 715/788 |
| 6,628,304 | B2  | * | 9/2003  | Mitchell et al.     | ...... 715/734 |
| 7,802,206 | B1  | * | 9/2010  | Davis et al.        | ...... 715/864 |
| 2002/0085035 | A1 | * | 7/2002 | Orbanes et al.      | ...... 345/764 |
| 2002/0113816 | A1 | * | 8/2002 | Mitchell et al.     | ...... 345/734 |
| 2006/0123360 | A1 | * | 6/2006 | Anwar et al.        | ...... 715/810 |
| 2006/0190333 | A1 | * | 8/2006 | Choi                | ...... 705/14  |
| 2006/0190833 | A1 | * | 8/2006 | SanGiovanni et al.  | ...... 715/767 |
| 2007/0106572 | A1 | * | 5/2007 | Janesky             | ...... 705/27  |

FOREIGN PATENT DOCUMENTS

| JP | 09-319889 A      | 12/1997 |
| KR | 10-2005-0074034 A | 7/2005  |
| KR | 10-2006-0057400 A | 5/2006  |
| KR | 10-2006-0092988 A | 8/2006  |

* cited by examiner

Primary Examiner — Omar Abdul-Ali
(74) Attorney, Agent, or Firm — Jefferson IP Law, LLP

(57) ABSTRACT

A mobile terminal and idle screen display method for the same are provided. The mobile terminal includes a memory unit for storing an idle screen image, a display unit for displaying the idle screen image, an input means for generating a selection signal to select a zone of the idle screen image, and a control unit for controlling transmission of the idle screen image from the memory unit to the display unit, for zooming-in, and for displaying a selected zone of the idle screen image.

23 Claims, 8 Drawing Sheets
(2 of 8 Drawing Sheet(s) Filed in Color)

Zoom Out

Zoom In

MOBILE TERMINAL AND IDLE SCREEN DISPLAY METHOD FOR THE SAME

PRIORITY

This application claims the benefit under 35 U.S.C. §119(a) of a Korean patent application filed on Oct. 11, 2006 in the Korean Intellectual Property Office and assigned Serial No. 2006-0099066, the entire disclosure of which is hereby incorporated by reference.

BACKGROUND OF THE INVENTION

1. Field of the Invention

The present invention relates generally to a mobile terminal. More particularly, the present invention relates to a mobile terminal and idle screen display method for the same wherein user interface features for selecting option functions and various items are displayed on an idle screen using a zoom in and out operation.

2. Description of the Related Art

With advances in communication technologies, a user can carry a mobile terminal and make and receive phone calls at most times and places. Advanced mobile terminals support various supplementary functions such as text message functions and image transmission functions, and functions for execution of application programs.

A mobile terminal includes a display unit for displaying various stored information or information received from external sources. The display unit provides visual information such as still or moving images to the user. For example, the display unit is used to enter a phone number for an outgoing call, display a message window for composing or viewing a message, and display operation states of the mobile terminal.

When the mobile terminal is opened or in an idle state, it displays an idle screen or initial screen on the display unit. However, the idle screen has been displayed in a static and uniform manner. Because the idle screen is one of the most frequently viewed screens, the user may find the idle screen dull and may not have interest in the mobile terminal.

SUMMARY OF THE INVENTION

An aspect of the present invention is to address at least the above-mentioned problems and/or disadvantages, and to provide at least the advantages described below. Accordingly, an aspect of the present invention is to provide a mobile terminal and idle screen display method for the same wherein an idle screen is displayed using a zoom feature.

In accordance with an aspect of the present invention, an idle screen display method for menu navigation through links in a mobile terminal is provided. The method includes selecting a zone of an idle screen, checking whether the selected zone is zoomable, and zooming in, if the selected zone is zoomable, and displaying the selected zone.

In accordance with another aspect of the present invention, an idle screen display method for a mobile terminal is provided. The method includes displaying an idle screen image including overlapping image elements having at least one link, selecting one of the image elements having a link, and moving to a zoomed-in image element indicated by a lower level link of the selected image element.

In accordance with another aspect of the present invention, a mobile terminal is provided. The terminal includes an idle screen image having at least one upper level menu, a first link page for zooming-in and displaying upon selection of one of the at least one upper level menu, having at least one lower level menu related to the selected upper level menu, a second link page for zooming-in and displaying upon selection of one of the at least one lower level menu, having at least one item related to the selected lower level menu, and an item screen for displaying, upon selection of one of at least one item, contents of the selected item.

In accordance with another aspect of the present invention, a mobile terminal is provided. The terminal includes a memory unit for storing an idle screen image, a display unit for displaying the idle screen image, an input means for generating a selection signal to select a zone of the idle screen image, and a control unit for controlling transmission of the idle screen image from the memory unit to the display unit, for zooming-in and displaying a selected zone of the idle screen image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of certain exemplary embodiments of the present invention will be more apparent from the following detailed description in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
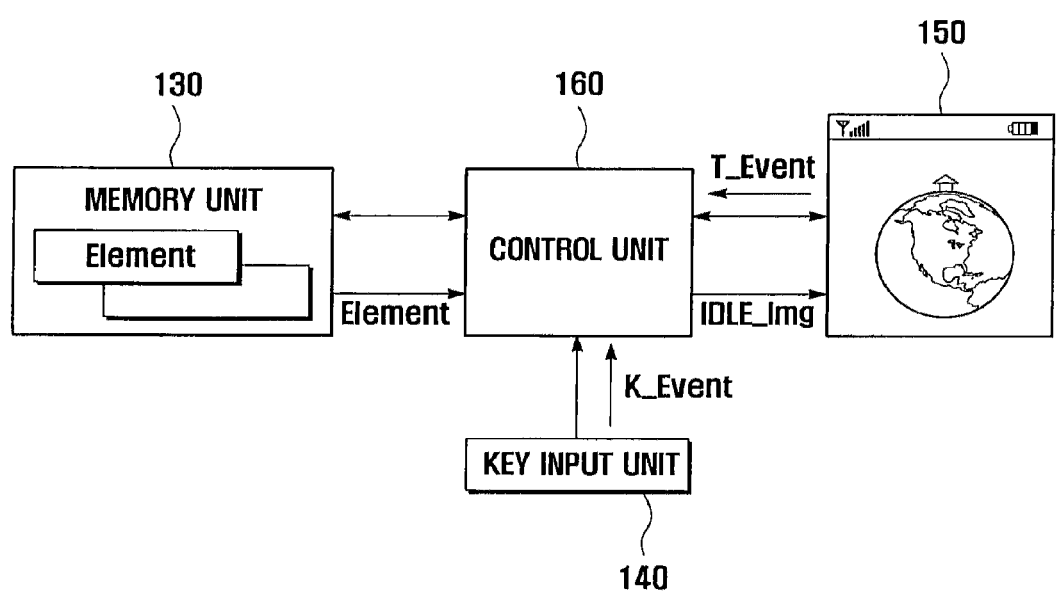
FIG. 1 illustrates a configuration of a mobile terminal according to an exemplary embodiment of the present invention.

The following description with reference to the accompanying drawings is provided to assist in a comprehensive understanding of the exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions or processes may be omitted for clarity and conciseness. Particular terms may be used to describe the invention in the best manner. However, the meaning of specific terms or words used in the specification and the claims should not be limited to the literal or commonly employed sense, but should be construed in accordance with the spirit of the invention. Therefore, it should be understood that various changes may be made and equivalents may be substituted for elements of the invention.

In an exemplary embodiment, the idle screen includes images of a tree and leaves. However, the present invention is not limited to a particular type of image in the idle screen. The idle screen of an exemplary embodiment of the present invention may include any zoomable image having a link zone and an ordinary zone. When the image is zoomed in, the image is divided into a lower-level link zone and lower-level conventional zone. The term 'link' refers to a mapping between a higher level menu and at least one lower level menu. The link zone includes higher level menus, and selection of one of the higher level menus results in movement to a link page including one of the at least one lower level menu corresponding to the selected higher level menu.

A signal for zooming in and out may be generated according to a touch event from a touch screen of a display unit, or to a key event from a keypad. A menu or link may also be selected using a sound signal.

The idle screen may be referred to as a standby screen or an initial screen.

An idle screen image IDLE_Img includes independent multi-level image elements Element. That is, an idle screen image IDLE_Img includes a link zone and ordinary zone. Zooming in of the link zone causes the link zone to be divided into a lower-level link zone and lower-level ordinary zone. Independent image elements Element can be assigned to the link zone, ordinary zone, lower-level link zone and lower-level ordinary zone, and be displayed together to form the idle screen image IDLE_Img.

For example, when image elements Element represent the sky, the sun, a migratory bird, a sea, a cloud and an excursion ship, an idle screen image IDLE_Img can be formed by combining the image elements Element together. In addition, if the image elements Element are independently moved, the idle screen image IDLE_Img can be viewed as a moving image representing a seascape.

The mobile terminal of an exemplary embodiment of the present invention includes a terminal that can display information obtained from a mobile communication network or information regarding functions of the mobile terminal in combination with image elements of the idle screen. The mobile terminal may be any information and communication appliance or multimedia appliance, such as a mobile communication terminal, digital broadcast receiving terminal, personal digital assistant (PDA), smart phone, international mobile telecommunications 2000 (IMT 2000) terminal, wideband code division multiple access (WCDMA) terminal, and universal mobile telecommunications system (UMTS) terminal.

Figure 2:
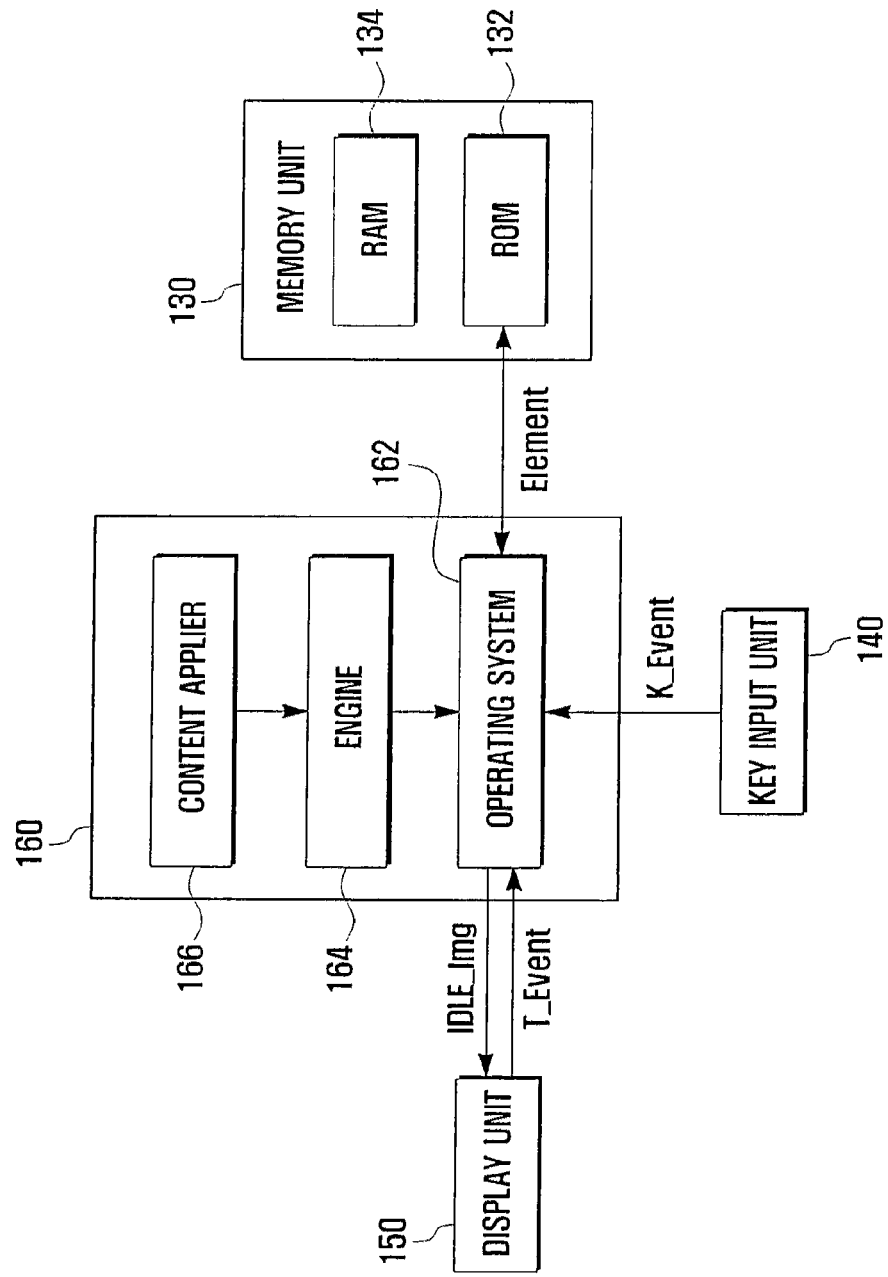
FIG. 2 illustrates a control unit and memory unit of the mobile terminal of FIG. 1.

FIG. 1 illustrates a configuration of a mobile terminal according to an exemplary embodiment of the present invention. FIG. 2 illustrates an exemplary control unit and memory unit of the mobile terminal of FIG. 1.

Referring to FIGS. 1 and 2, an exemplary mobile terminal includes a memory unit 130, key input unit 140, display unit 150, and control unit 160.

The memory unit 130 stores an idle screen image IDLE_Img, and sends the idle screen image IDLE_Img to the display unit 150 upon activation of an idle screen, under a control of the control unit 160. The idle screen may be activated, for example, when a slide unit of a slide type phone is moved or a folder unit of a folder type phone is opened. The memory unit 130 includes a program memory section and a data memory section, and can be implemented by using a read only memory (ROM) 132 and a random access memory (RAM) 134.

The program memory section stores an operating system for booting the mobile terminal, application programs for playing multimedia contents, application programs for supplementary functions related to photographing and playing of audio and video data and the like. When one of these functions is activated in response to a user request, the mobile terminal executes a corresponding application program under the control of the control unit 160.

The data memory section stores data generated from operation of the mobile terminal. The data memory section stores data such as photographs, videos, audios, phonebooks, digital contents, data regarding user data and the like. In particular, the data memory section may store a plurality of idle screen images IDLE_Img, and sends a selected idle screen image IDLE_Img to the display unit 150 with some modifications under the control of the control unit 160. An idle screen image IDLE_Img is divided into separate zones, and zooming in of a zone causes the zone to be displayed in an enlarged form. The idle screen image IDLE_Img is described later in connection with FIGS. 3A to 3D.

The key input unit 140 includes a plurality of alphanumeric and function keys for inputting alphanumeric information and setting various functions. The function keys may include direction, side, and shortcut keys associated with particular functions. The key input unit 140 sends a key signal, generated by the user for setting and controlling operations of the mobile terminal, to the control unit 160.

In particular, the key input unit 140 generates a key event K_Event according to a user action for selecting a link zone in the idle screen image IDLE_Img, and sends the key event K_Event to the control unit 160. When a link zone in the idle screen image IDLE_Img is selected, the border line of the selected link zone becomes thick or the color thereof is reversed by default. Movements between link zones can be made through direction and numeric keys of the key input unit 140. When the display unit 150 has a touch screen capability, movements between link zones can be made more easily by using the touch screen.

The display unit 150 displays the idle screen image IDLE_Img. The display unit 150 may include a panel of liquid crystal display (LCD) devices. If the panel has a touch screen capability, the display unit 140 can also act as an input means.

In addition to the idle screen image IDLE_Img, the display unit 150 displays link pages and item pages selected through link zones in the idle screen image IDLE_Img.

The control unit 160 controls the overall operation of the mobile terminal and signal exchange between internal components of the mobile terminal.

In particular, the control unit 160 sends an idle screen image IDLE_Img stored in the memory unit 130 to the display unit 150 in response to activation of the display unit 150. If the display unit 150 has a touch screen capability, the control unit 160 detects a touch event T_Event from the display unit 150 and makes a movement between links in the idle screen image IDLE_Img according to the touch event T_Event. The control unit 160 can also make a movement between links using a key event K_Event from the keypad of the key input unit 140. Further, when an icon in the idle screen image IDLE_Img or in a link page is coupled to an application of the mobile terminal, the control unit 160 controls zooming in of the icon for immediate execution of the coupled application in response to detection of a touch event T_Event or key event K_Event to the icon.

Referring to FIG. 2, an exemplary control unit 160 includes an operating system 162 for controlling display of an idle screen image IDLE_Img according to external stimuli such as a touch event T_Event and key event K_Event, a content applier 166 for associating image elements Element from the operating system 162 with touch events T_Event and key events K_Event so that the image elements Element can be zoomed in and out according to a touch event T_Event and key event K_Event, and an engine 164 for relaying transmission of image elements Element between the content applier 166 and operating system 162.

The operating system 162 sends data on a location of the idle screen image IDLE_Img selected through a touch event T_Event and key event K_Event to the content applier 166. The operating system 162 also sends image elements Element stored in the memory unit 130 to the content applier 166 on the basis of a request from the content applier 166. When the content applier 166 creates zoom information for associating image elements Element with touch events T_Event and key events K_Event and stores the zoom information in the memory unit 130, the operating system 162 composes an idle screen image IDLE_Img using the image elements Element and zoom information and outputs the idle screen image IDLE_Img to the display unit 150. Hence, link pages such as menus can be zoomed in and out through the idle screen image IDLE_Img.

The content applier 166 creates zoom information by associating image elements Element from the memory unit 130 with touch events T_Event and key events K_Event so that the image elements Element can be zoomed in and out according to a touch event T_Event and key event K_Event, and stores the created zoom information in the memory unit 130 for composition of an idle screen image IDLE_Img.

The engine 164 relays transmission of image elements Element, and touch events T_Event and key events K_Event between the content applier 166 and operating system 162.

An exemplary mobile terminal of the present embodiment may further include a radio frequency unit, power supply unit, camera module, and digital broadcast receiving module.

An idle screen image IDLE_Img includes independent image elements Element. The idle screen image IDLE_Img includes link zones, ordinary zones and items, and each link zone is associated with at least one image element Element. In the idle screen image IDLE_Img, selection of a link zone through an event causes movement between an upper-level link and a lower-level link with zooming in and out.

FIGS. 3A to 3D illustrate exemplary representations of an idle screen image with zooming in and out.

In an idle screen image IDLE_Img, a link zone includes a plurality of links selectable through a touch event T_Event or key event K_Event, and each link of the link zone may be associated with a lower-level link zone. For example, selection of a link 'menu' in a link zone leads to a movement to a lower-level link zone having links 'call', 'ring tone', 'screen setting', 'game', 'schedule management' and 'others' (submenus of the 'menu' menu). Further, a link of the lower-level link zone may be associated with a next lower-level link zone having items corresponding to menu items of a submenu. Multi-level links and items are arranged in forms of images on the idle screen image IDLE_Img, and a movement is made from an upper-level link to a lower-level link or an item according to a user selection. The movement is made together with a zoom-in operation.

Figure 3A:
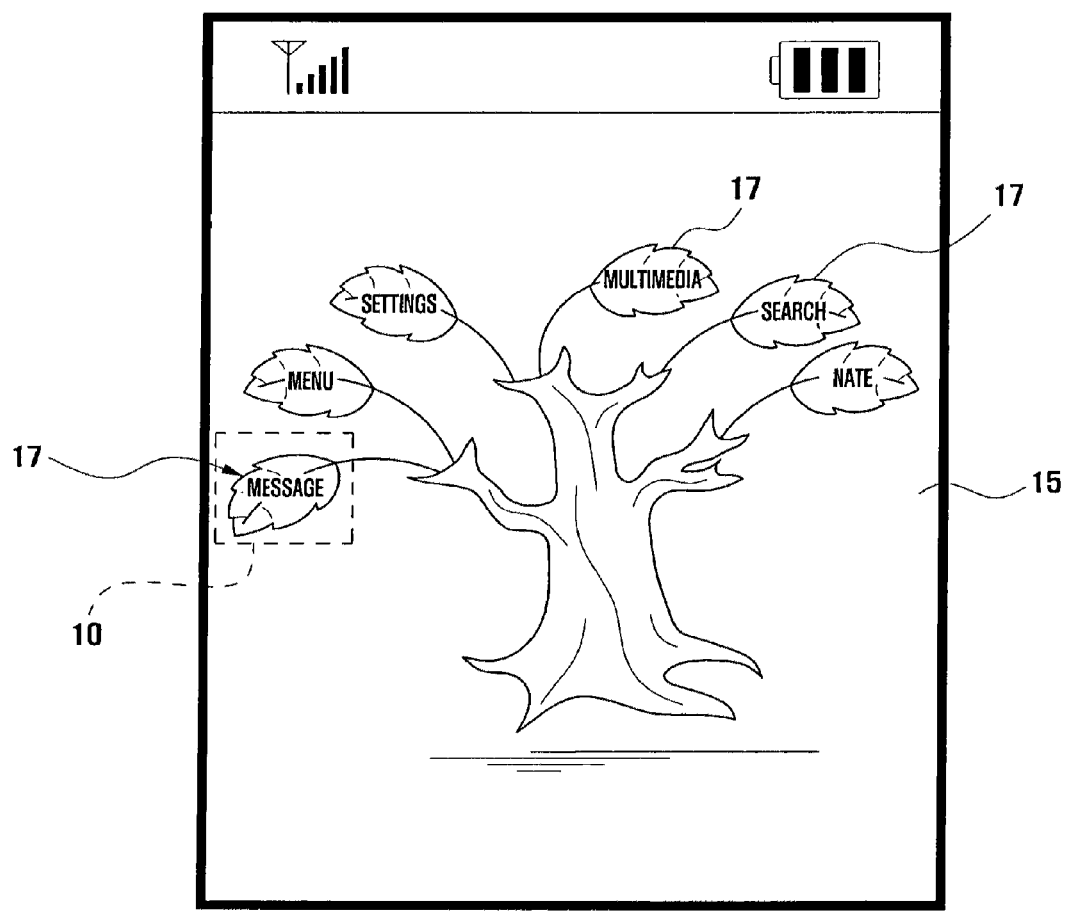
FIGS. 3A to 3D illustrate exemplary representations of an idle screen image with zooming in and out.
Figure 3B:
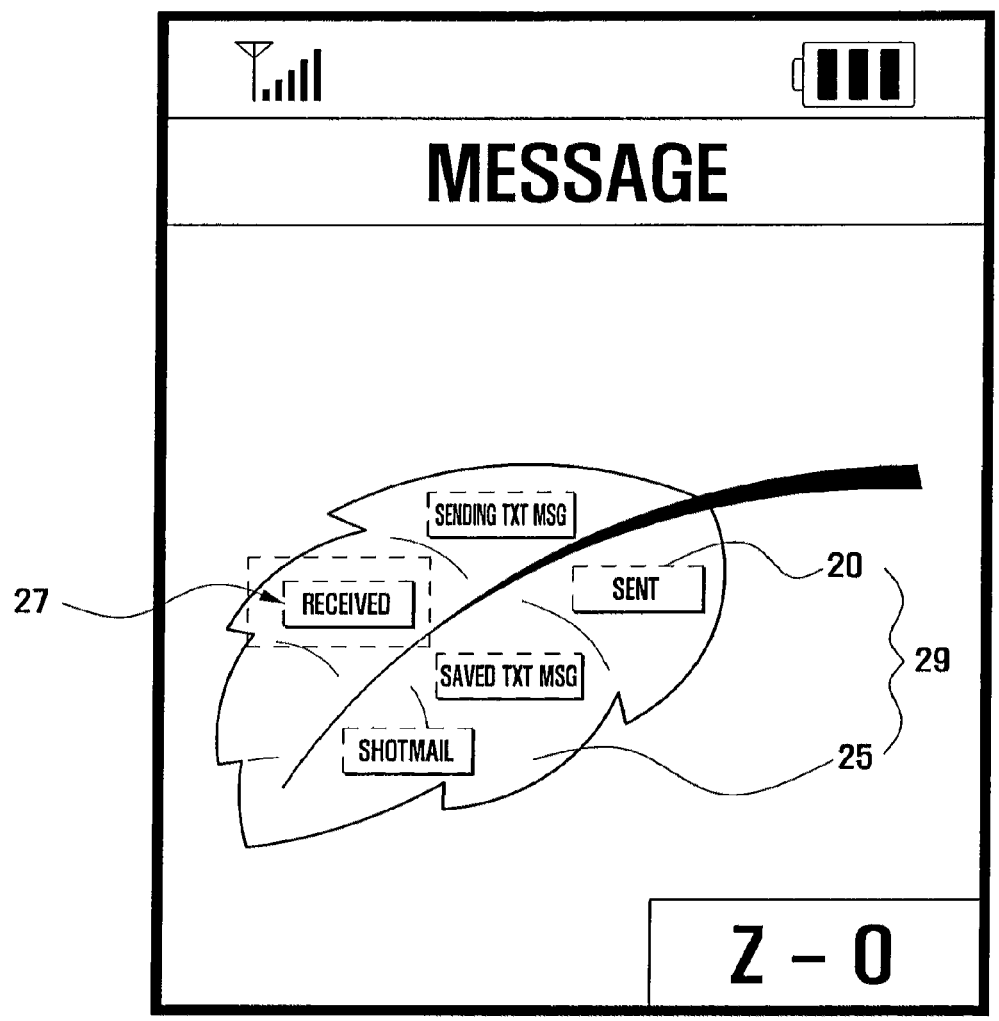

Referring to FIG. 3A, an exemplary idle screen image IDLE_Img includes a first link zone 10 having a plurality of upper level links 17, and a first ordinary zone 15. As illustrated in FIG. 3B, each upper level link 17 may be associated with a plurality of lower level links 27.

The first link zone 10 includes a plurality of upper level links 17, each of which is associated with a plurality of lower level links 27. The first link zone 10 includes at least one image or icon representing the upper level links 17. The upper level links 17 may be arranged in sequence or at regular intervals. Selection of an upper level link 17 causes movement to a link page having images representing associated lower level links 27 together with a zoom-in operation. For example, the upper level links 17 are assigned to basic functions of the mobile terminal, or are mapped to top level menus for the mobile terminal.

The first ordinary zone 15 is a zone filled with images not associated with a link. The first ordinary zone 15 is used to display status icons or bars related to operations of the mobile terminal, and is complementary to the first link zone 10.

Referring to FIG. 3B, a first link page 29 includes a second link zone 20 having a plurality of lower level links 27, and a second ordinary zone 25. The first link page 29 is a zoomed-in page displayed by selection of an upper level link 17 of the first link zone 10 in the idle screen image IDLE_Img. A zoom-out button z-o is provided at a corner of the first link page 29 for returning to the previous screen, namely, the idle screen image IDLE_Img. That is, clicking of the zoom-out button z-o causes a return from the first link page 29 to the idle screen image IDLE_Img by zooming out.

Figure 3C:
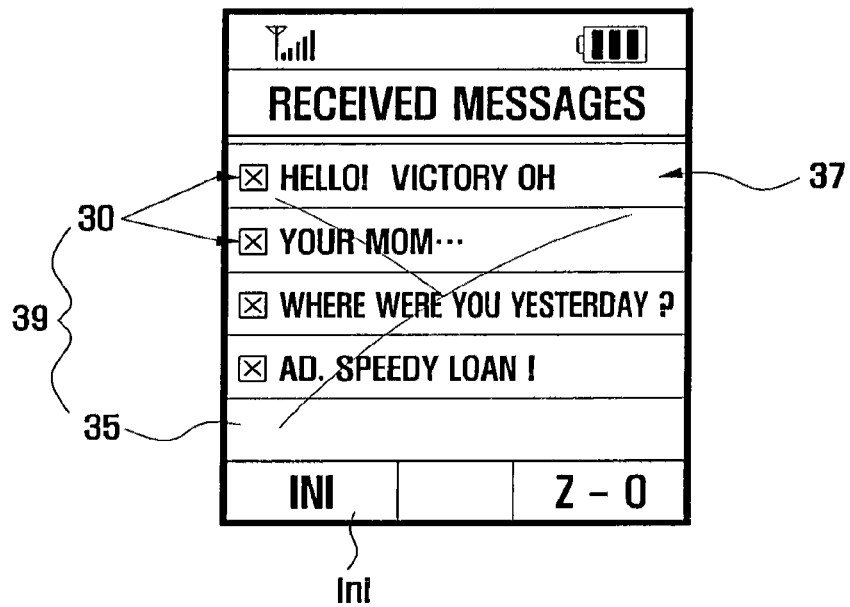

The second link zone 20 includes at least one lower level link 27. The second link zone 20 includes at least one image or icon representing the lower level links 27. The lower level links 27 may be arranged in sequence or at regular intervals. The background image of the lower level links 27 is a zoomed-in portion of the idle screen image IDLE_Img, in an exemplary implementation, next to a corresponding upper level link 17. As illustrated in FIG. 3C, selection of a lower level link 27 causes movement to a page having images representing associated items 37 together with a zoom-in operation. The lower level links 27 may correspond to submenus of a top level menu. For example, if a selected upper level link in the first link zone 10 of the idle screen image IDLE_Img is associated with a 'multimedia' menu, the lower level links 27 may be associated with submenus 'game', 'MP3', 'camera', 'moving image' and the like.

The second ordinary zone 25 is a zone filled with images not associated with a link, and complementary to the second link zone 20. The background image of the second ordinary zone 25 may be set according to a user selection.

Referring to FIG. 3C, a second link page 39 includes a third link zone 30 having a plurality of items 37, and a third ordinary zone 35 as a background of the items 37. The second link page 39 is a zoomed-in page displayed by selection of a lower level link 27 in the second link zone 20 of the first link page 29. A zoom-out button z-o is provided at a corner of the second link page 39 for returning to the previous page, namely, the first link page 29. An initialization button Ini is provided at another corner of the second link page 39 for returning to the initial screen, namely, the idle screen image IDLE_Img. That is, clicking of the zoom-out button z-o causes a return to the first link page 29 together with a zooming-out operation. Clicking of the initialization button Ini causes a return to the idle screen image IDLE_Img together with a zooming-out or page-switch operation.

The third link zone 30 includes items 37 in the second link page 39. The third link zone 30 includes at least one image or icon representing the items 37. The items 37 may be arranged at regular intervals. Selection of an item 37 causes movement to a page having details of the selected item 37. For example, for an upper level link 17 of 'message', lower level links 27 of 'received', 'sent', 'saved text', and 'sending text' can be grouped. Then, selection of the lower level link 27 of 'received' may cause display of a page containing items 37 of received messages.

The third ordinary zone 35 is a non-item zone other than the third link zone 30. A background image in the mobile terminal can be displayed at the third ordinary zone 35.

Figure 3D:
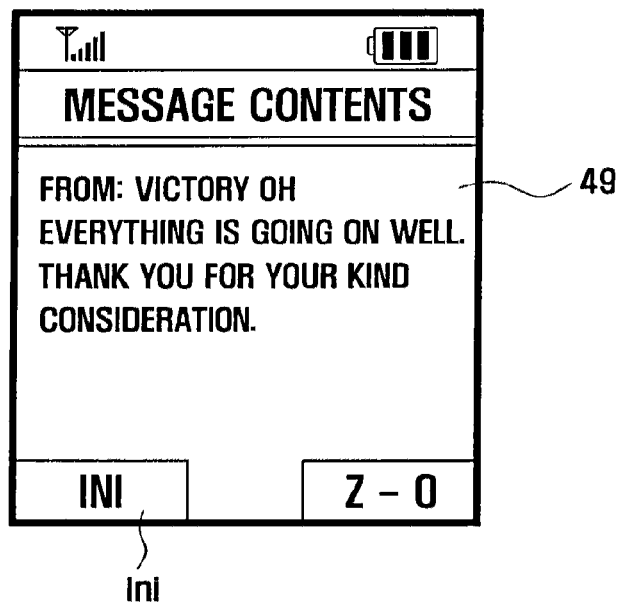

FIG. 3D illustrates contents of a selected item 37 in the second link page 39. If the selected item 37 is a 'received message' item, contents of a received message are displayed on an item screen 49. A zoom-out button z-o is provided at a corner of the item screen 49 for returning to the previous page, namely, the second link page 39. An initialization button Ini is provided at another corner of the item screen 49 for returning to the initial screen, namely, the idle screen image IDLE_Img. That is, clicking of the zoom-out button z-o causes a return to the second link page 39 together with a zooming-out operation. Clicking of the initialization button Ini causes a return to the idle screen image IDLE_Img together with a zooming-out or page-switch operation.

As described above, an exemplary idle screen of the present embodiment includes a link zone having multi-level links selectable together with a zoom in and out operation, and an ordinary zone acting as a background of the link zone. In addition to the upper level links 17, lower level links 27 and items 37, the idle screen may have an additional level of links.

Figure 4:
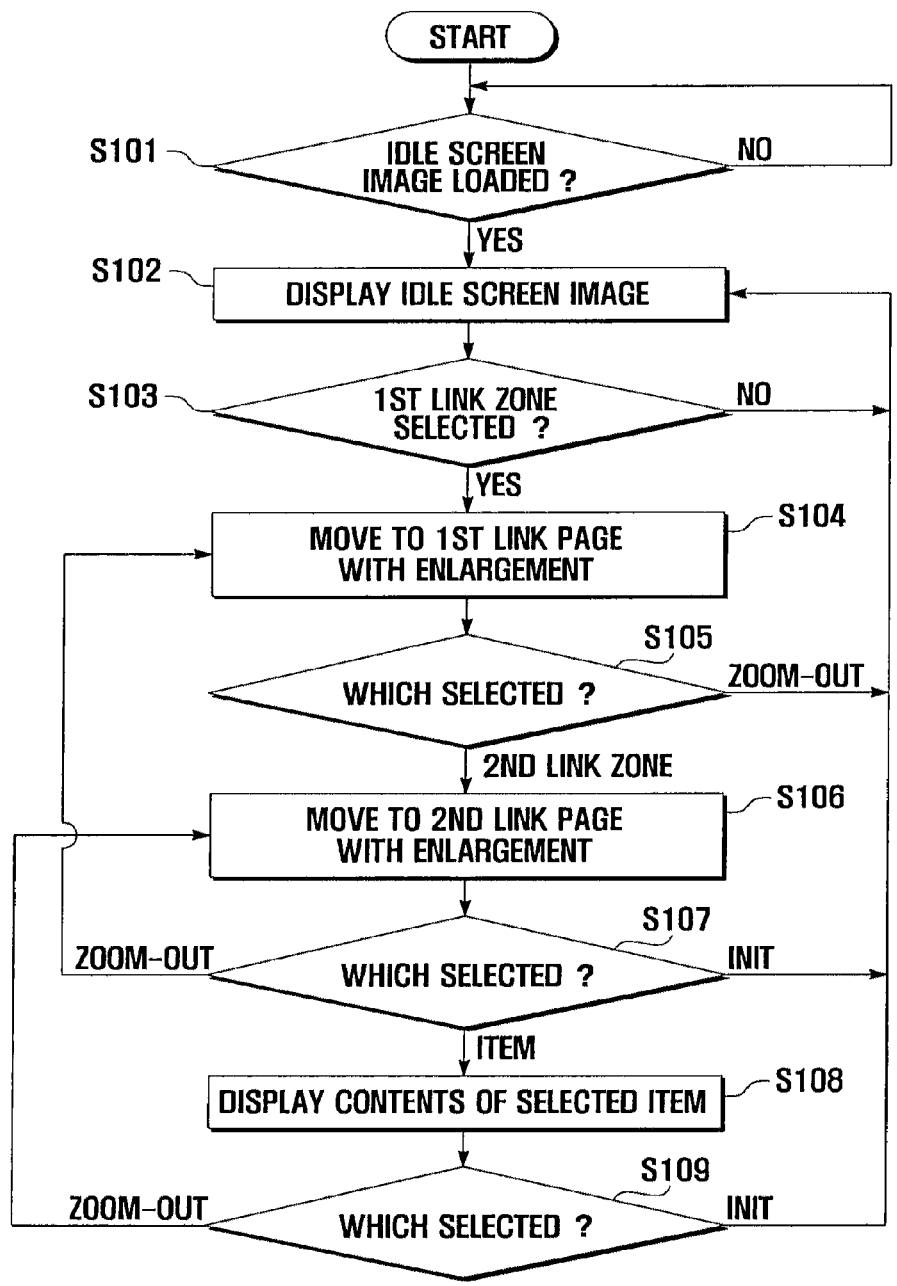
FIG. 4 is a flow chart illustrating an idle screen display method according to another exemplary embodiment of the present invention.

FIG. 4 is a flow chart illustrating an idle screen display method according to an exemplary embodiment of the present invention.

Referring to FIG. 4, the control unit 160 of the mobile terminal determines whether image elements Element of an idle screen image IDLE_Img are loaded from the memory unit 130 at step S101.

For example, The control unit 160 detects an event for activation of the display unit 150. For example, movement of a slide unit, opening of a folder unit, clicking of a particular key button and the like may lead to activation of the display unit 150, thereby loading the image elements Element.

If the image elements Element are loaded, the control unit 160 displays the idle screen image IDLE_Img including the image elements Element on the display unit 150 at step S102.

The idle screen image IDLE_Img includes a first link zone 10 having upper level links 17, and a first ordinary zone 15 with no link. When an upper level link 17 of the first link zone 10 is selected, a movement is made to a first link page 29 associated with the selected upper level link 17. The idle screen image IDLE_Img as a wallpaper may include still and moving images, and upper level links 17 can be configured to move to a certain extent for the feeling of movement. For example, when the idle screen image IDLE_Img includes an image of a tree and images of leaves associated with upper level links 17, the images of leaves can be set to move for representation of tree leaves blowing in the wind.

During display of the idle screen image IDLE_Img, the control unit 160 determines whether an upper level link 17 of the first link zone 10 is selected through a touch screen of the display unit 150 or through a keypad of the key input unit 140 at step 103.

If an upper level link 17 is selected, the control unit 160 makes a movement to a first link page 29 by enlarging a region containing the selected upper level link 17 through a zoom-in operation at step S104.

The first link page 29 includes a second link zone 20 having lower level links 27 associated with the selected upper level link 17, and a second ordinary zone 25. For example, the lower level links 27 correspond to submenus of a menu related to the selected upper level link 17, and the background of the lower level links 27 is a zoomed-in portion of the background of the selected upper level link 17.

The control unit 160 determines which of the first link page 29 is selected at step S105. If the zoom-out button z-o in the second ordinary zone 25 is selected through a touch event T_Event or key event K_Event, the control unit 160 returns to the previous screen, namely, the idle screen image IDLE_Img together with a zoom-out operation.

If a lower level link 27 in the second link zone 20 is selected, the control unit 160 makes a movement to a second link page 39 by enlarging a region containing the selected lower level link 27 through a zoom-in operation at step S1106.

The second link page 39 includes a third link zone 30 having a plurality of items 37 related to the selected lower level link 27, and a third ordinary zone 35. For example, the items 37 are associated with submenus of the menu of the selected lower level link 27. A zoom-out button z-o is provided at a corner of the second link page 39 for returning to the previous page, namely, the first link page 29. Clicking of the zoom-out button z-o causes returning to the first link page 29 together with a zooming-out operation. An initialization button Ini is provided at another corner of the second link page 39 for returning to the initial screen, namely, the idle screen image IDLE_Img. Clicking of the initialization button Ini causes returning to the idle screen image IDLE_Img together with a zooming-out or page-switch operation.

The control unit 160 determines which of the second link page 39 is selected at step S107. If the zoom-out button z-o is selected, the control unit 160 returns to step S104 for the first link page 29 through a zooming-out operation. If the initialization button Ini is selected, the control unit 160 returns to step S102 for the idle screen image IDLE_Img through a zooming-out or page-switch operation.

If an item 37 in the third link zone 30 is selected, the control unit 160 displays contents of the selected item 37 in an item screen 49 at step S108.

During display of the item screen 49, the control unit 160 determines which of the item screen 49 is selected at step S109. If the zoom-out button z-o is selected, the control unit 160 returns to step S106 for the second link page 39 through a zooming-out operation. If the initialization button Ini is selected, the control unit 160 returns to step S102 for the idle screen image IDLE_Img through a zooming-out or page-switch operation.

Figure 5A:
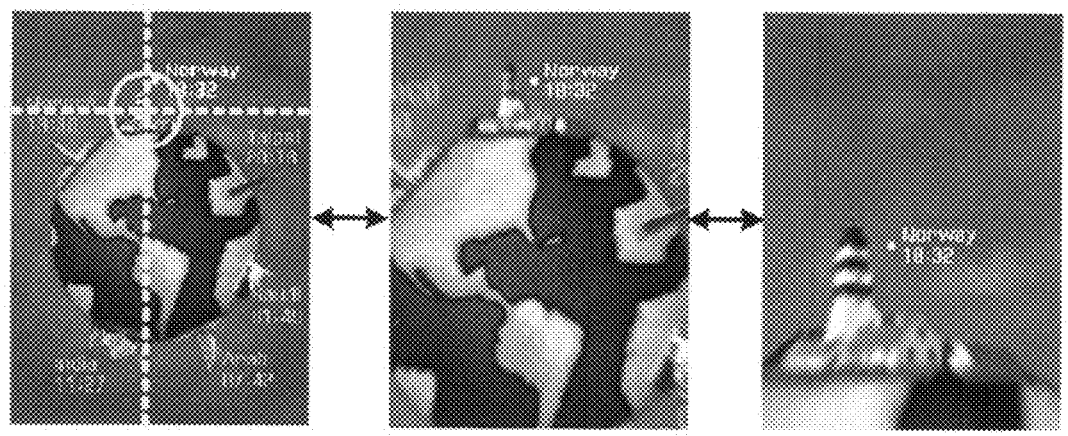
FIGS. 5A to 5C illustrate exemplary representations for the method of FIG. 4.
Figure 5A:
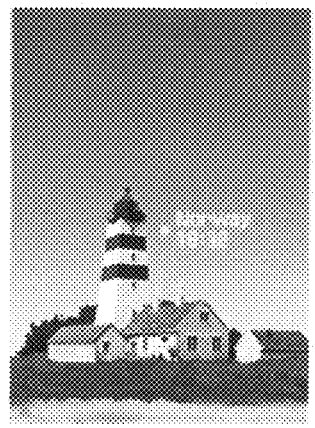
Figure 5B:
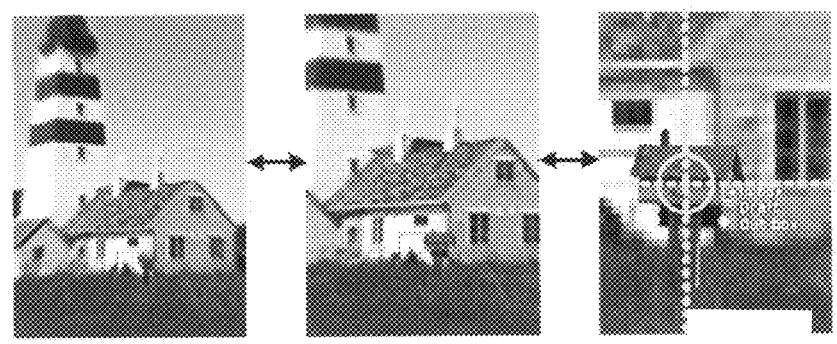
Figure 5C:
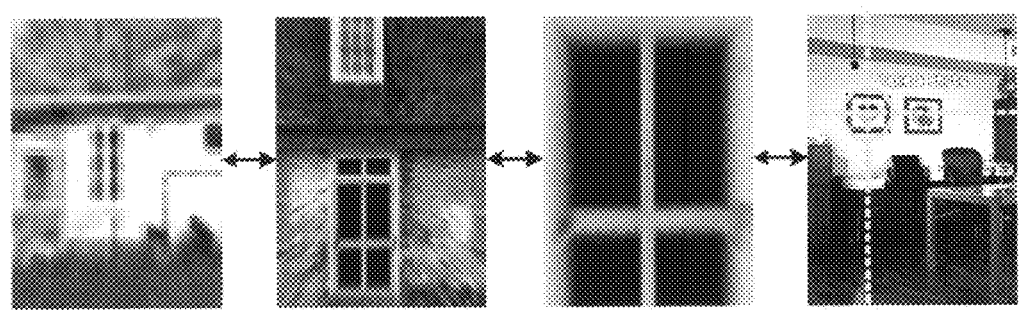

FIGS. 5A to 5C illustrate exemplary representations for the idle screen display method of FIG. 4.

In FIGS. 5A to 5C, image elements Element for constituting an idle screen image IDLE_Img are images representing the earth and backgrounds thereof, houses, house scenes, postboxes, windows and the like. The image elements Element are used for zooming in and out of a selected region in the idle screen image IDLE_Img under the control of the control unit 160. The zoom-out operation is performed in response to activation of an image having a zoom-out button z-o. In addition, image elements Element can be associated with option applications for, for example, photographing, digital broadcast reception and music playing. Activation of an image element Element associated with an application causes execution of the associated application.

In an idle screen image IDLE_Img of FIG. 5A, a globe is located at the center, and houses are arranged in interested countries. When a house arranged in Norway is selected for activation, the image associated with the selected house is zoomed in into a scene. The remaining houses may display their local times and country names to represent world standard times.

In FIG. 5B, the house selected in FIG. 5A is further zoomed in. In zooming-in, the overall scene fades out and details of the house fade in. A postbox indicates a link zone for a movement to a lower level menu. A coordinate marker or indicator may be used to indicate a particular link zone. A link zone may also be represented differently from an ordinary zone for easy recognition.

In FIG. 5C, the zoomed-in house in FIG. 5B is further zoomed in. In zooming-in, a portion of the house is detailed or the inside of the house is represented. For example, a window of the house indicates a link zone, and selectable menus are present in the house. That is, menus in FIG. 5C are submenus of a menu in FIG. 5B.

As apparent from the above description, the exemplary embodiments of the present invention provide a mobile terminal and idle screen display method for the same, wherein zoom in and out operations are used for menu navigation in an idle screen image.

While exemplary embodiments of the present invention have been shown and described in this specification, it will be understood by those skilled in the art that various changes or modifications of the embodiments are possible without departing from the spirit and scope of the invention as defined by the appended claims and their equivalents.

What is claimed is:

1. An idle screen display method for menu navigation through links arranged in a hierarchical structure in a mobile terminal, the method comprising:
   selecting a zone of an idle screen, the idle screen comprising a top level of the hierarchical structure;
   determining whether the selected zone is zoomable; and
   zooming in, if the selected zone is zoomable, and displaying the selected zone such that a magnified image of the selected zone is then used as a new display screen image,
   wherein the idle screen comprises a visual image of an object or location comprising visual elements displayed when the mobile terminal is in an idle state or an initial state,
   wherein the zone comprises a selectable visual element of the object or location,
   wherein the visual elements comprise independent multi-level image elements, the independent multi-level image elements being assigned to a link zone, an ordinary zone, a lower-level link zone, and a lower-level ordinary zone, and displayed to form the idle screen, and
   wherein the link zone and the ordinary zone comprise a level of the hierarchical structure, the lower-level link zone and the lower-level ordinary zone comprise a lower level of the hierarchical structure, and the ordinary zone and the lower-level ordinary zone comprise non-selectable image elements of the visual image of the object or location.

2. The idle screen display method of claim 1, wherein the idle screen comprises:
   the link zone comprising a portion of the idle screen corresponding to the visual element of the object or location for, upon selection, zooming in; and
   the ordinary zone comprising a remainder of the idle screen different from the link zone.

3. The idle screen display method of claim 2, wherein the link zone comprises at least one upper level link leading to a link page comprising at least one lower level link.

4. The idle screen display method of claim 3, wherein the link page comprises:
   the lower level link zone comprising a visual element of the object or location for, upon selection, zooming in; and
   the ordinary zone comprising a remainder of the link page different from the lower level link zone.

5. The idle screen display method of claim 3, wherein the link page comprises:
   an item comprising a selectable visual element of the object or location for, upon selection, providing at least one of a display of contents of the item and an activation of an application associated with the item; and
   the ordinary zone comprising a remainder of the link page separated from the item.

6. The idle screen display method of claim 3, wherein the link page comprises at least one of a button for returning to a previous screen and another button for returning directly to the idle screen.

7. The idle screen display method of claim 6, wherein the button causes zooming-out for returning to the previous screen.

8. The idle screen display method of claim 3, wherein the selecting of the zone of the idle screen comprises selecting the zone using at least one of a key event from a keypad and a touch event from a touch screen.

9. An idle screen display method for a mobile terminal, the method comprising:
   displaying an idle screen image of an object or location comprising overlapping image elements of the object or location comprising at least one link, the idle screen comprising a top level of a hierarchical structure;
   selecting one of the image elements comprising a link; and
   transitioning the display to a lower level of the hierarchical structure comprising a zoomed-in image element of the object or location indicated by a lower level link of the selected image element,
   wherein an idle screen comprises a visual image of the object or location displayed when the mobile terminal is in an idle state or an initial state,
   wherein the selectable image elements of the object or location comprise independent multi-level image elements, the independent multi-level image elements being assigned to a link zone, an ordinary zone, a lower-level link zone, and a lower-level ordinary zone, and displayed to form the idle screen, and
   wherein the link zone and the ordinary zone comprise a level of the hierarchical structure, the lower-level link zone and the lower-level ordinary zone comprise a lower level of the hierarchical structure, and the ordinary zone and the lower-level ordinary zone comprise non-selectable image elements of the visual image of the object or location.

10. The idle screen display method of claim 9, wherein the lower level link comprises:
    an item comprising a selectable visual element of the zoomed-in image element of the object or location for, upon selection, providing at least one of a display of contents of the item and an activation of an application associated with the item; and
    the ordinary zone separated from the item.

11. The idle screen display method of claim 9, wherein the lower level link comprises at least one of a button for returning to a previous screen and another button for returning directly to the idle screen.

12. The idle screen display method of claim 11, wherein the button causes zooming-out for returning to the previous screen.

13. The idle screen display method of claim 9, wherein the selecting of the one of the image elements of the object or location comprising a link comprises selecting using at least one of a key event from a keypad and a touch event from a touch screen.

14. A mobile terminal comprising:
    a hierarchical user interface comprising at least one menu;
    an idle screen image comprising at least one upper level menu comprising at least one selectable visual element of an object or location comprising the idle screen image, the idle screen image comprising a visual image of the object or location displayed when the mobile terminal is in an idle state or an initial state;

a first link page for zooming in and displaying one of the at least one upper level menu and comprising at least one lower level menu comprising a selectable visual element of the object or location related to the selected upper level menu;

a second link page for zooming in and displaying one of the at least one lower level menu and comprising at least one item comprising a selectable visual element of the object or location related to the selected lower level menu; and an item screen for displaying, upon selection of one of the at least one item, contents of the selected item, wherein the selectable visual element of the object or location comprises independent multi-level image elements, the independent multi-level image elements being assigned to a link zone, an ordinary zone, a lower-level link zone, and a lower-level ordinary zone, and displayed to form the idle screen, and wherein the link zone and the ordinary zone comprise a level of the hierarchical user interface, the lower-level link zone and the lower-level ordinary zone comprise a lower level of the hierarchical user interface, and the ordinary zone and the lower-level ordinary zone comprise non-selectable image elements of the visual image of the object or location.

15. The mobile terminal of claim 14, wherein the first link page further comprises a zoom-out button for returning to the idle screen image through a screen change according to zooming out.

16. The mobile terminal of claim 14, wherein the second link page comprises:
a zoom-out button for returning to the first link page through a screen change according to zooming out; and
an initialization button for returning directly to the idle screen image through a screen change according to at least one of zooming out and page switching.

17. A mobile terminal comprising:
a hierarchical user interface comprising at least one menu;
a memory unit for storing an idle screen image, the idle screen image comprising a visual image of an object or location displayed when the mobile terminal is in an idle state or an initial state;
a display unit for displaying the idle screen image;
an input means for generating a selection signal to select a zone of the idle screen image, the zone comprising at least one selectable visual element of the object or location; and
a control unit for controlling transmission of the idle screen image from the memory unit to the display unit, and for zooming-in and displaying a selected zone of the idle screen image, wherein the selectable visual element of the object or location comprises independent multi-level image elements, the independent multi-level image elements being assigned to a link zone, an ordinary zone, a lower-level link zone, and a lower-level ordinary zone, and displayed to form the idle screen, and wherein the link zone and the ordinary zone comprise a level of the hierarchical user interface, the lower-level link zone and the lower-level ordinary zone comprise a lower level of the hierarchical user interface, and the ordinary zone and the lower-level ordinary zone comprise non-selectable image elements of the visual image of the object or location.

18. The mobile terminal of claim 17, wherein the input means comprises at least one of a key input unit for generating a key event and a touch screen for generating a touch event.

19. The mobile terminal of claim 17, wherein the idle screen image comprises:
the link zone comprising a portion of the idle screen image zoomed-in upon selection; and
the ordinary zone comprising a remainder of the idle screen image different from the link zone,
wherein the link zone has at least one upper level link leading to a link page having at least one lower level link.

20. The mobile terminal of claim 19, wherein the link page comprises:
the lower level link zone for, upon selection, zooming in; and
the ordinary zone different from the lower level link zone.

21. The mobile terminal of claim 19, wherein the link page comprises:
an item comprising a selectable visual element of the object or location for, upon selection, providing at least one of a display of contents of the item and an activation of an application associated with the item; and
the ordinary zone comprising a remainder of the link page different from the item.

22. The mobile terminal of claim 19, wherein the link page comprises at least one of a zoom-out button for returning to the previous screen and an initialization button for returning directly to the idle screen.

23. The idle screen display method of claim 1, wherein the selectable visual element of the object or location comprising the zone is animated so as to display movement in the idle screen visual image, the movement indicating that the zone is selectable.

* * * * *